United States Patent
Jiang et al.

(10) Patent No.: US 11,640,515 B2
(45) Date of Patent: May 2, 2023

(54) METHOD AND NEURAL NETWORK SYSTEM FOR HUMAN-COMPUTER INTERACTION, AND USER EQUIPMENT

(71) Applicant: HUAWEI TECHNOLOGIES CO., LTD., Guangdong (CN)

(72) Inventors: Xin Jiang, Hong Kong (CN); Zhengdong Lu, Hong Kong (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 907 days.

(21) Appl. No.: 15/993,619

(22) Filed: May 31, 2018

(65) Prior Publication Data

US 2018/0276525 A1    Sep. 27, 2018

Related U.S. Application Data

(63) Continuation of application No. PCT/CN2016/091892, filed on Jul. 27, 2016.

(30) Foreign Application Priority Data

Dec. 3, 2016   (CN) .................. 2015108852135.X

(51) Int. Cl.
*G06N 3/00* (2006.01)
*G06N 3/04* (2006.01)
(Continued)

(52) U.S. Cl.
CPC ......... *G06N 3/006* (2013.01); *G06F 16/3329* (2019.01); *G06F 40/216* (2020.01);
(Continued)

(58) Field of Classification Search
CPC ..... G06N 3/0427; G06N 3/0445; G06N 3/006
See application file for complete search history.

(56) References Cited

U.S. PATENT DOCUMENTS 5,519,608 A * 5/1996 Kupiec ............... G06F 16/3344
704/9
7,251,637 B1 * 7/2007 Caid .................... G06K 9/4623
706/15
(Continued)

FOREIGN PATENT DOCUMENTS

CN          1952928 A      4/2007
CN        101566998 A     10/2009
(Continued)

OTHER PUBLICATIONS

Vinyals et al. (Grammaras a Foreign Language, Dec. 2015, pp. 1-9) (Year: 2015).*

(Continued)

*Primary Examiner* — George Giroux

(57) ABSTRACT

A method and neural network system for human-computer interaction, and user equipment are disclosed. According to the method for human-computer interaction, a natural language question and a knowledge base are vectorized, and an intermediate result vector that is based on the knowledge base and that represents a similarity between a natural language question and a knowledge base answer is obtained by means of vector calculation, and then a fact-based correct natural language answer is obtained by means of calculation according to the question vector and the intermediate result vector. By means of this method, a dialog and knowledge base-based question-answering are combined by means of vector calculation, so that natural language interaction can be performed with a user, and a fact-based correct natural language answer can be given according to the knowledge base.

23 Claims, 3 Drawing Sheets

(51) Int. Cl.

| | |
|---|---|
| *G06F 16/332* | (2019.01) |
| *G06N 3/08* | (2006.01) |
| *G06F 40/30* | (2020.01) |
| *G06F 40/216* | (2020.01) |
| *G06N 3/006* | (2023.01) |
| *G06N 3/084* | (2023.01) |

(52) U.S. Cl.
CPC .......... *G06F 40/30* (2020.01); *G06N 3/0427* (2013.01); *G06N 3/0445* (2013.01); *G06N 3/0454* (2013.01); *G06N 3/084* (2013.01)

(56) References Cited

U.S. PATENT DOCUMENTS

| | | | | |
|---|---|---|---|---|
| 7,475,015 | B2* | 1/2009 | Epstein | G10L 15/1815 704/4 |
| 2002/0116174 | A1* | 8/2002 | Lee | G06K 9/6217 704/9 |
| 2011/0320187 | A1 | 12/2011 | Motik et al. | |
| 2014/0236577 | A1 | 8/2014 | Malon et al. | |
| 2015/0293976 | A1* | 10/2015 | Guo | G06N 3/0454 707/706 |
| 2016/0012336 | A1* | 1/2016 | Franceschini | G06F 16/3334 706/55 |
| 2016/0358094 | A1* | 12/2016 | Fan | G06F 16/24578 |
| 2017/0083507 | A1* | 3/2017 | Ho | G06N 3/08 |
| 2017/0286494 | A1* | 10/2017 | He | G06F 16/24537 |
| 2017/0351677 | A1* | 12/2017 | Chaubal | G06F 16/248 |

FOREIGN PATENT DOCUMENTS

| | | |
|---|---|---|
| CN | 103049433 A | 4/2013 |
| CN | 104915386 A | 9/2015 |
| CN | 105068661 A | 11/2015 |
| CN | 105095444 A | 11/2015 |
| JP | 2013254420 A | 12/2013 |

OTHER PUBLICATIONS

Chan et al. (Listen, Attend and Spell: a Neural Network for Large Vocabulary Conversational Speech Recognition, Mar. 2016, pp. 4960-4964) (Year: 2016).*
Bordes et al. (A semantic matching energy function for learning with multi-relational data, May 2013, pp. 233-259) (Year: 2013).*
Neelakantan et al. (Neural Programmer: Inducing Latent Programs with Gradient Descent, Nov. 2015, pp. 1-17) (Year: 2015).*
Wang et al. (Semantic expansion using word embedding clustering and convolutional neural network for improving short text classification, Oct. 2015, pp. 806-814) (Year: 2015).*
Ding et al. (Using Conditional Random Fields to Extract Contexts and Answers of Questions from Online Forums, 2008, pp. 710-718) (Year: 2008).*
Bengio et al. (A Neural Probabilistic Language Model, 2000, pp. 1-7) (Year: 2000).*
Lyyer et al. (A Neural Network for Factoid Question Answering over Paragraphs, 2014, pp. 633-644) (Year: 2014).*
Dzmitry Bahdanau et al., Neural Machine Translation By Jointly Learning To Align and Translate. Published as a conference paper at ICLR 2015, Apr. 24, 2015, 15 pages.
Lifeng Shang et al., Neural Responding Machine for Short-Text Conversation. Proceedings of the 53rd Annual Meeting of the Association for Computational Linguistics and the 7th International Joint Conference on Natural Language Processing, Beijing, China, Jul. 26-31, 2015, 10 pages.
Antoine Bordes et al., Question Answering with Subgraph Embeddings. arXiv:1406.3676v3 [cs.CL] Sep. 4, 2014, 10 pages.
K. Cho, B. Van Merrienboer, C. Gulcehre, D. Bahdanau, F. Bougares, H. Schwenk, and Y. Bengio. Learning phrase representations using rnn encoder-decoder for statistical machine translation. EMNLP, 2014, Sep. 3, 2014, 15 pages.
S. Hochreiter and J. Schmidhuber. Long short-term memory. Neural Computation, 9(8):1735-1780, 1997, 32 pages.
K. Cho, B. van Merrienboer, D. Bahdanau, and Y. Bengio. On the properties of neural machine translation: Encoder-decoder approaches. arXiv preprint arXiv:1409.1259, 2014, Oct. 7, 2014, 9 pages.
A. Bordes, J. Weston, and N. Usunier. Open question answering with weakly supervised embedding models. In ECML PKDD, pp. 165-180. 2014, Apr. 16, 2014, 16 pages.
I. Sutskever, O. Vinyals, and Q. V. Le. Sequence to sequence learning with neural networks. In NIPS, pp. 3104-3112, 2014, 9 pages.

* cited by examiner

METHOD AND NEURAL NETWORK SYSTEM FOR HUMAN-COMPUTER INTERACTION, AND USER EQUIPMENT

CROSS-REFERENCE TO RELATED APPLICATIONS

This application is a continuation of International Application No. PCT/CN2016/091892, filed on Jul. 27, 2016, which claims priority to Chinese Patent Application No. 201510882135.X, filed on Dec. 3, 2015. The disclosures of the aforementioned applications are hereby incorporated by reference in their entireties.

TECHNICAL FIELD

Embodiments of the present application relate to the field of computers, and more specifically, to a method and neural network system for human-computer interaction, and user equipment.

BACKGROUND

With rapid development of mobile Internet and intelligent terminals, human-computer interaction is more and more widely applied. Major Internet companies have launched their own intelligent assistants, such as Apple Siri, Google Now, Microsoft Cortana, Facebook M, Baidu Duer, and Microsoft Xiaoice. Currently, intelligent assistants can have simple conversations with humans, and can accomplish some basic tasks. Technologies relevant to intelligent assistants still need continuous development and improvement toward a higher degree of personification, erudition and more capable of accomplishing complex tasks.

Human-computer interaction relates to many technologies, such as speech recognition, natural language understanding, natural language dialog, automatic question-answering, search, recommendation, and speech synthesis.

The automatic question-answering technology means that an automatic question-answering system can directly answer a question raised by a user in a natural language. A main indicator for evaluating quality of the automatic question-answering is correctness of the answer. The automatic question-answering system relates to multiple technologies of different fields, such as natural language processing, information retrieval, and knowledge base. There are various types of questions. One variety of question-answering that is of interest in the automatic question-answering system is factoid question answering. Examples of the automatic question-answering system in the industry include IBM Watson, Google, Baidu, Wolfram Alpha, and the like. The knowledge base technology is a technology closely linked to the automatic question-answering system. In the knowledge base technology, structured knowledge is obtained from data and is collated and converged, and querying and reasoning are performed on the knowledge base.

In the automatic question-answering technology, accuracy of semantic parsing process is a problem not yet completely resolved. An answer of a question by the automatic question-answering often faces problems of natural language polysemy and ambiguity.

The natural language dialog technology means that a natural language dialog system is capable of having a semantically relevant conversation with a user. Indicators for evaluating the conversation include semantic correlation and language correctness (including language coherence, grammatical correctness, and the like) of a reply in a conversation. Examples of the natural language dialog system include Microsoft Xiaoice, Baidu Baixiaodu, and the like. The natural language dialog technology is a very challenging direction in the field of natural language processing. In recent years, with development and application of deep learning technologies, a deep neural network-based natural language dialog system has been invented and proved, by some data, to be significantly superior to conventional technologies.

The deep neural network-based natural language dialog system is capable of generating a semantically relevant reply. However, due to limitations of the model, correctness of a reply sentence cannot always be ensured. For example, a reply to a question "How tall is Yao Ming?" may be "Yao Ming is 1.7 meters tall." This reply is proper only from the perspective of language, but is incorrect from the perspective of knowledge.

In the existing technologies or systems, only automatic question-answering or natural language dialog is considered. Therefore, accuracy of a reply to a question in the dialog is low.

SUMMARY

The present application provides a method and neural network system for human-computer interaction, and user equipment, so as to perform natural language interaction with a user and give a fact-based correct natural language answer according to a knowledge base.

According to a first aspect, the present application provides a method for human-computer interaction, including:

obtaining, by a neural network system, a natural language question input by a user;

converting, by the neural network system, the natural language question to a question vector;

obtaining, by the neural network system from a knowledge base by means of text retrieval, at least one knowledge answer relevant to the natural language question, where each knowledge answer corresponds to one knowledge answer vector;

obtaining, by the neural network system, an intermediate result vector that is based on the knowledge base by means of calculation according to the question vector and the at least one knowledge answer vector, where the intermediate result vector is used to indicate a similarity between the question vector and each knowledge answer vector; and using, by the neural network system, the question vector and the intermediate result vector as inputs, and generating a natural language answer to the natural language question by calculating a probability of an output sequence.

The obtaining an intermediate result vector that is based on the knowledge base by means of calculation according to the question vector and the at least one knowledge answer vector includes:

using the question vector and the at least one knowledge answer vector as inputs of a second neural network module in the neural network system, and calculating a similarity between the question vector and each knowledge answer vector by using the second neural network module, where the similarity is an element of the intermediate result vector.

The foregoing process is a process in which the neural network system is used. In the using process, a knowledge answer vector may be calculated after at least one knowledge answer is selected. In addition, a knowledge answer vector may be trained in advance in a training process of the neural network system. In an example, the knowledge answer is a triplet, and the knowledge answer vector is a triplet vector, where the triplet vector is obtained by means of calculation by using the triplet as an input of a fourth neural network module in the neural network system.

Specifically, the triplet vector may be determined according to the following steps:

respectively expressing a subject, a predicate, and an object of the triplet by using a first one-hot vector, a second one-hot vector, and a third one-hot vector;

respectively performing an operation on the first one-hot vector, the second one-hot vector, and the third one-hot vector by using a projection matrix, to obtain a first low-dimensional vector, a second low-dimensional vector, and a third low-dimensional vector, where the projection matrix is a parameter of the fourth neural network module; and obtaining the triplet vector by means of calculation according to the first low-dimensional vector, the second low-dimensional vector, and the third low-dimensional vector.

In the training process, parameters of the neural network system, that is, parameters of the first neural network module, the second neural network module, the third neural network module, and the fourth neural network module may be obtained by maximizing a result of a likelihood function on training data, where the training data includes multiple groups of natural language questions and natural language answers.

Preferably, the training may be performed by using a stochastic gradient descent algorithm.

In an optional implementation of the first aspect, the converting the natural language question to a question vector may include:

using the natural language question as an input of a first neural network module in the neural network system, and expressing a word sequence of the natural language question as a low-dimensional vector sequence; and performing an operation on the low-dimensional vector sequence by using a recursive neural network model or a convolutional neural network model of the first neural network module, to obtain the question vector.

In an optional implementation of the first aspect, the using the question vector and the intermediate result vector as inputs, and generating a natural language answer to the natural language question by calculating a probability of an output sequence may include:

using the question vector and the intermediate result vector as inputs of a third neural network module in the neural network system, and generating the natural language answer by calculating a joint probability of an output sequence by using a recursive neural network model or a convolutional neural network model of the third neural network module, where the question vector and the intermediate result vector are used as conditions for the output sequence.

In an optional implementation of the first aspect, the using the question vector and the intermediate result vector as inputs, and generating a natural language answer to the natural language question by calculating a probability of an output sequence includes:

using the question vector and the intermediate result vector as inputs, and generating the natural language answer by calculating a probability of an output sequence by using a recursive neural network model, of the third neural network module, that is based on an attention vector technology.

According to a second aspect, a neural network system for human-computer interaction is provided, including an obtaining module, a first neural network module, a retrieval module, a second neural network module, and a third neural network module, which are configured to perform the corresponding implementations of the first aspect. The obtaining module is configured to obtain a natural language question input by a user; the first neural network module is configured to convert the natural language question obtained by the obtaining module to a question vector; the retrieval module is configured to obtain, from a knowledge base by means of text retrieval, at least one knowledge answer relevant to the natural language question obtained by the obtaining module, where each knowledge answer corresponds to one knowledge answer vector; the second neural network module is configured to obtain an intermediate result vector that is based on the knowledge base by means of calculation according to the question vector obtained by the first neural network module and the at least one knowledge answer vector obtained by the retrieval module, where the intermediate result vector is used to indicate a similarity between the question vector and each knowledge answer vector; and the third neural network module is configured to: use the question vector obtained by the first neural network module and the intermediate result vector obtained by the second neural network module as inputs, and generate a natural language answer to the natural language question by calculating a probability of an output sequence.

In an optional implementation of the second aspect, the second neural network module is specifically configured to:

use the question vector and the at least one knowledge answer vector as inputs, and calculate a similarity between the question vector and each knowledge answer vector, where the similarity is an element of the intermediate result vector.

In an optional implementation of the second aspect, the knowledge answer is a triplet, and the knowledge answer vector is a triplet vector, and the neural network system further includes:

a fourth neural network module, configured to obtain the triplet vector by means of calculation by using the triplet as an input.

In an optional implementation of the second aspect, the fourth neural network module is specifically configured to:

respectively express a subject, a predicate, and an object of the triplet by using a first one-hot vector, a second one-hot vector, and a third one-hot vector;

respectively perform an operation on the first one-hot vector, the second one-hot vector, and the third one-hot vector by using a projection matrix, to obtain a first low-dimensional vector, a second low-dimensional vector, and a third low-dimensional vector, where the projection matrix is a parameter of the fourth neural network module; and obtain the triplet vector by means of calculation according to the first low-dimensional vector, the second low-dimensional vector, and the third low-dimensional vector.

In an optional implementation of the second aspect, the first neural network module is specifically configured to:

use the natural language question as an input, and express a word sequence of the natural language question as a low-dimensional vector sequence; and perform an operation on the low-dimensional vector sequence by using a recursive neural network model or a convolutional neural network model, to obtain the question vector.

In an optional implementation of the second aspect, the third neural network module is specifically configured to:

use the question vector and the intermediate result vector as inputs, and generate the natural language answer by calculating a joint probability of an output sequence by using a recursive neural network model or a convolutional neural network model, where the question vector and the intermediate result vector are used as conditions for the output sequence.

In an optional implementation of the second aspect, the third neural network module is specifically configured to:

use the question vector and the intermediate result vector as inputs, and generate the natural language answer by calculating a probability of an output sequence by using a recursive neural network model that is based on an attention vector technology.

In an optional implementation of the second aspect, parameters of the first neural network module, the second neural network module, the third neural network module, and the fourth neural network module are obtained by maximizing a result of a likelihood function on training data, where the training data includes multiple groups of natural language questions and natural language answers.

According to a third aspect, user equipment having a human-computer interaction function is provided, including an input device, a processor, and a memory, where the input device is configured to obtain an input by a user, the memory is configured to store instructions, and the processor is configured to execute the instructions stored in the memory, to perform the corresponding implementations of the first aspect, and the components of the user equipment according to the third aspect may correspond to corresponding modules in the neural network system according to the second aspect.

Preferably, the user equipment according to the third aspect may further include an output device, configured to output the natural language answer generated by the neural network system.

According to the method and neural network system for human-computer interaction, and the user equipment provided in the embodiments of the present application, a natural language question and a knowledge base are vectorized, and a dialog and knowledge base-based question-answering are combined by means of vector calculation, so that natural language interaction can be performed with a user, and a fact-based correct natural language answer can be given according to the knowledge base.

BRIEF DESCRIPTION OF DRAWINGS

The following briefly describes the accompanying drawings used in describing the embodiments or the prior art.

DESCRIPTION OF EMBODIMENTS

Figure 1:
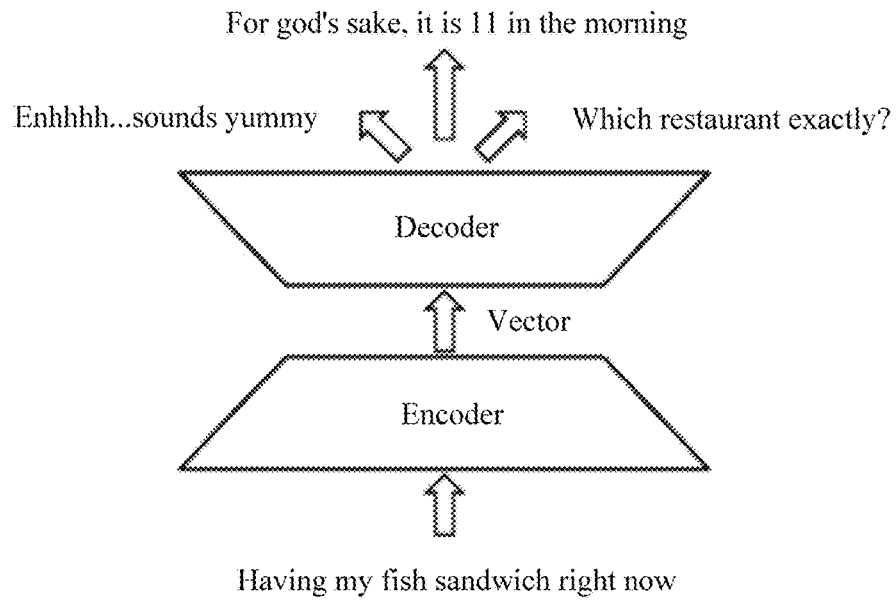
FIG. 1 is a schematic architectural diagram of a short-text dialog model.

The following describes the technical solutions in the embodiments of the present application with reference to the accompanying drawings.

Several types of existing automatic question-answering systems and natural language dialog systems are briefly described below.

1. Information Retrieval-Based Automatic Question-Answering System:

An information retrieval-based automatic question-answering is usually performed in three steps: question analysis, document retrieval, and answer extraction.

Question analysis: a question raised by a user is analyzed by using natural language processing technology, including question type recognition, headword extraction, synonym expansion, question reporting, and the like.

Document retrieval: retrieval and sorting are performed in an indexed document base according to an output in the step of question analysis, and paragraphs relevant to the question are found in relevant documents.

Answer extraction: possible answer fragments in the relevant paragraphs returned in the step of document retrieval are extracted, scored, and sorted according to type of the question, and a most relevant answer is finally returned.

There are technical challenges in all of the foregoing three steps. This may lead to relatively low accuracy of the question-answering system. In addition, a conventional retrieval system cannot deal with a problem of literal mismatch. For example, a question is "Who is Yao Ming's wife?" and a record in a document states that "Yao Ming's spouse is . . . ". In this case, because the word "wife" does not literally match the word "spouse", an answer may not be returned or an answer may be incorrect.

2. Structured Knowledge Base-Based Automatic Question-Answering System:

In a structured knowledge base-based automatic question-answering system, structured knowledge is first obtained or mined from a large amount of data (which is usually non-structured or semi-structured data), and a structured knowledge base is constructed. A structure of knowledge is usually represented by using a triplet: (subject, predicate, object). The subject is usually an entity, the object may be another entity or an attribute, and the predicate indicates a relationship between the subject and the object. For example, (Yao Ming, wife, Ye Li) is a triplet. A knowledge base includes multiple triplets and usually may be represented by using a structure of a graph (where a node of the graph is an entity, and an edge is a relationship). Similar concepts include semantic web, ontology library, linked data, knowledge graph, and the like. Because knowledge in a knowledge base is usually obtained from multiple data sources, convergence and ambiguity elimination of knowledge is part of the work of knowledge base construction. The foregoing process of automatically constructing a knowledge base may have a problem of accuracy, and manual calibration is used when necessary.

After the knowledge base is constructed, querying and reasoning may be performed on the knowledge base. Because the knowledge base is structured data, the knowledge base may be stored as a relation database or a graph database. In addition, querying is performed on the knowledge base by using a structured-data query sentence, for example, the Structured Query Language (SQL) and the Simple Protocol and RDF Query Language (SparQL), where RDF refers to the Resource Description Framework. A natural language input by a user needs to be converted to a specific query language, and this process is usually referred to as semantic parsing. Semantic parsing is a very challenging task in natural language processing.

The foregoing technology faces challenges of two aspects. In one aspect, construction of a large-scale knowledge base is a complex process. Complete automation cannot be achieved by using the current natural language processing technologies and therefore manual intervention-based calibration is usually needed. In another aspect, semantic parsing has problems that have not been completely resolved, such as problems of natural language polysemy and ambiguity.

Currently, a hybrid technology of the prior art 1 (information retrieval-based automatic question-answering) and the prior art 2 (knowledge base-based automatic question-answering) may be used in an automatic question-answering system in the industry.

3. Information Retrieval-Based Natural Language Dialog System:

In the information retrieval-based natural language dialog, a large-scale dialog corpus is indexed in an "original text-reply" manner. During an online conversation, an original text similar to a user input is found by searching and a reply corresponding to the original text is returned to the user.

However, it cannot be ensured that the system returns a semantically relevant conversation when the user input matches the corpus in the base to a relatively low degree. In short, the system cannot be expanded and cannot generate a reply that never exists in the corpus.

4. Machine Translation Model-Based Natural Language Dialog System:

An original text is analogous to a source language (for example, English) and a reply is analogous to a target language (for example, Chinese) in machine translation. Then, a method of statistical machine translation (for example, phrase-based machine translation) is used for training. During testing (that is, when the system is used), a user input is used as a source language input of a statistical translation model, and a target language sequence, that is, a reply to the user is generated by using the translation model.

The machine translation model does not function well on actual short-text dialog, and a main reason is that data distribution of the dialog data is different from that of a bilingual "parallel corpus" in machine translation. In dialog data, there may be many different replies to a same original text. In the machine translation model, a linear mapping relationship between words is mainly considered, and such a complex mapping relationship may be the reason why the machine translation model fails.

5. Deep Neural Network-Based Natural Language Dialog System:

As deep learning develops, a deep neural network architecture-based "sequence-to-sequence" learning model is proposed in the academia. The technology of the deep neural network-based natural language dialog is applied to a natural language dialog system obtained by training a large-scale dialog corpus. In the system, an input sequence from a user is accepted, and a reply sequence is output word by word after calculation of multiple layers of neural networks.

FIG. 1 is a schematic architectural diagram of a short-text dialog model. Specifically, an input natural language sequence is converted to an intermediate representation vector or an intermediate result vector by an encoder. An output sequence is generated by a decoder based on the intermediate representation vector or the intermediate result vector. The decoder and the encoder are separately implemented by using a Recurrent Neural Network (RNN), and a next-step output is more purposefully determined by using an attention vector technology in each step of decoding.

The deep neural network-based natural language dialog system has an effect better than that of the retrieval-based dialog system and machine translation-based dialog system. However, although being capable of generating a semantically relevant reply, the deep neural network-based natural language dialog system cannot ensure correctness of a reply sentence due to limitation of the model. For example, a reply to a question "How tall is Yao Ming?" may be "Yao Ming is 1.7 m tall." This reply is proper only from the perspective of language, but is incorrect from the perspective of knowledge. Therefore, how to enable the deep neural network-based natural language dialog system to return a dialog that is correct in knowledge is a problem having a practical meaning and with which the present application is concerned.

6. The Attention Vector Technology:

In the attention vector technology, an original question and a part already output of an answer can be aligned, so that a neural network system can output a next word more accurately. The effect of the attention vector technology has been proven in both the machine translation model and the short-text dialog model.

An attention vector $C_j$ is usually calculated in the following manner:

$$c_j = \Sigma_{i=1}^{T} \alpha_{j,i} h_i,$$

where $\{h_i\}_{i=1}^{T}$ is a state vector set of an encoder, and $\alpha_{j,i}$ is a dynamic weighting coefficient. $\alpha_{j,i}$ is usually calculated in the following manner:

$$\alpha_{j,i} = \frac{\exp(a_{j,i})}{\Sigma_k \exp(a_{j,k})},$$

where $a_{j,i} = f(s_{j-1}, h_i)$. $s_{j-1}$ herein represents a $(j-1)^{th}$ state vector of a decoder, and f is a neural network model with parameters.

A commonly used form of f is:

$$f(s_{j-1}, h_i) = v_a^T \tan h(W_a s_{j-1} + U_a h_j)$$

where each of $v_a$, $W_a$, $U_a$ is a parameter vector or a matrix. In such a calculation manner, each time generating a word, the decoder dynamically refers to the state vectors of the encoder, and such a dynamic weight is determined by functions of a last state vector of the decoder and all state vectors of the encoder.

To sum up, only automatic question-answering or natural language dialog is considered in the existing technologies or systems, and accuracy of a reply to a question in the dialog is low. In the present application, a deep neural network-based natural language dialog system is used as part of a base, a natural language dialog and knowledge base-based question-answering are combined by using deep learning technologies, so that the system can, in a dialog, give a natural language reply that is correct in knowledge to a question raised by a user.

It should be understood that, the method for human-computer interaction provided in the embodiments of the present application is a neural network model-based natural language dialog question-answering method, and the provided neural network system for human-computer interaction is a neural network model-based natural language dialog question-answering system.

As a machine learning model, the neural network model-based natural language dialog question-answering system may have a training phase and a using phase.

In the training phase, a likelihood function on training data is maximized according to the training data and by using a back propagation learning algorithm, a stochastic gradient descent algorithm, or the like, to determine parameters of modules in the neural network system. In the embodiments of the present application, all used training data may include such an instance: (question, answer, matching triplet). For example, Question: How tall is Yao Ming?
Answer: He is 2.29 m and is very very tall.
Matching triplet: (Yao Ming, height, 2.29 m).
For another example:
Question: Who wrote *Dream of the Red Chamber*?
Answer: It is written by Cao Xueqin in the Qing dynasty.
Matching triplet: (*Dream of the Red Chamber*, author, Cao Xueqin).

In the using phase, calculation is performed by using models in the neural network system based on an already constructed knowledge base and by using a natural language question of a user as an input, to generate a natural language answer and return the answer to the user.

For ease of understanding, description below starts from the training phase.

A structured knowledge base (also briefed as knowledge base in the specification) and training data are constructed first.

The knowledge base includes some "facts". The structured knowledge base includes records or "tuples". Specifically, the structured knowledge base may be obtained from the Internet. In the embodiments of the present application, the knowledge base may specifically include multiple triplets, or may include a database having multiple pieces of structured records. This is not limited in the embodiments of the present application. Using that the knowledge base includes multiple triplets as an example, a web page may be captured from an encyclopedic knowledge website such as Baidu Baike, Hudong Baike, or Douban, and structured triplets may be obtained by parsing a table on the web page. By performing further processing such as noise reduction and combination, multiple triplets are finally extracted, to form the structured knowledge base.

The training data may be obtained from the Internet. The training data may be natural language question-answering dialog data. In the embodiments of the present application, a web page may be captured from a community-driven question-and-answer website such as Baidu Knows or Soso Wenwen, and "question-answer" pairs may be parsed, to extract multiple "question-answer" pairs.

In the training process, the foregoing "question-answer" pair data may be scanned one by one, to check whether the data matches one or more triplets in the knowledge base. A definition of "match" may be: 1. A subject of a triplet appears in the question. 2. An object of the triplet appears in the answer. 3. The object of the triplet does not appear in the question.

It should be understood that, in the embodiments of the present application, size of the knowledge base and size of the training data may be adjusted according to a training requirement. In a specific example, the structured knowledge base may include 5.5 million triplets, and may include 132 million "question-answer" pairs, from which 696 thousand "question-answer" pairs are selected as training data.

In the embodiments of the present application, each word may correspond to one "one-hot" vector. The one-hot vector means that, for example, there are A words in a language, each word is numbered and any word corresponds to one one-hot vector. The one-hot vector has M dimensions. An element corresponding to the number of the word is 1, and the remaining elements are 0. The one-hot vector is a high-dimensional vector.

It is assumed that an input natural language question is a sequence $x=(x_1,x_2,K,x_T)$, that is, the natural language question is decomposed into T words, respectively corresponding to $x_1,x_2,K,x_T$. $x_i$ (i=1, 2, . . . T) is a one-hot vector.

It is assumed that an output natural language answer is $y=(y_1,y_2,K,y_{T'})$ that is, the natural language answer includes T' words. The T' words respectively correspond to $y_1,y_2,K,y_{T'}$. $y_i$ (i=1, 2 . . . T') is a one-hot vector.

A triplet is $t=(t_s,t_p,t_o)$ $t_{s/p/o}$ are one-hot vectors and respectively represent a subject, a predicate, and an object of the triplet.

Figure 2:
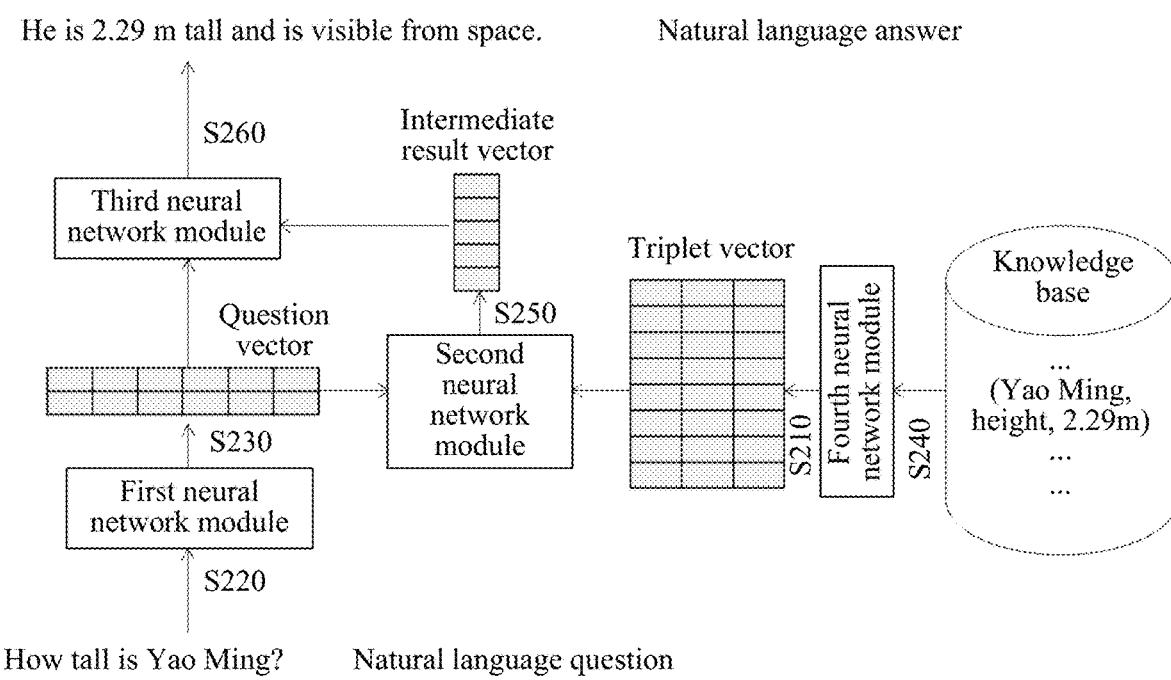
FIG. 2 is a schematic diagram of a training process for human-computer interaction according to an embodiment of the present application.

FIG. 2 is a schematic diagram of a training process for human-computer interaction according to an embodiment of the present application. As shown in FIG. 2, the training process includes the following steps.

S210: Use a triplet in a structured knowledge base as an input of a fourth neural network module in a neural network system, to obtain a triplet vector by means of calculation. It should be understood that, the triplet is used as an example for description in this embodiment. However, the knowledge base is not limited to a form of the triplet, but may be in another structured form.

Specifically, the structured knowledge base includes N triplets. Each triplet includes a subject, a predicate, and an object. Different triplets may have same items. Therefore, the knowledge base includes a limited quantity of items. Each item (that is, word) in the knowledge base is mapped to the following low-dimensional vector using a first projection matrix $W^t$:

$$u_s^t = W^t_s, u_p^t = W^t_p, u_o^t = W^t_o.$$

That is, $u_{s/p/o}^t$ are low-dimensional vector representations of $t_{s/p/o}$. A triplet vector may be further obtained according to the low-dimensional vector representation of the word. An optional manner is obtaining an average, that is:

$$u^t = (u_s^t + u_p^t + u_o^t)/3$$

It should be understood that obtaining an average is only an implementable manner, and the triplet vector may be obtained according to the low-dimensional vector of the word in another manner. This is not limited in this embodiment of the present application.

To sum up, the triplet vector is determined according to the following steps:

respectively expressing a subject, a predicate, and an object of the triplet by using a first one-hot vector, a second one-hot vector, and a third one-hot vector;

respectively performing an operation on the first one-hot vector, the second one-hot vector, and the third one-hot vector by using a projection matrix, to obtain a first low-dimensional vector, a second low-dimensional vector, and a third low-dimensional vector, where the projection matrix is a parameter of the fourth neural network module; and obtaining the triplet vector by means of calculation according to the first low-dimensional vector, the second low-dimensional vector, and the third low-dimensional vector.

A set $\{u_i^t\}_{i=1}^N$ of all triplet vectors in the knowledge base may constitute a low-dimensional vector representation of the knowledge base.

The first projection matrix $W^t$ is a parameter of the fourth neural network module, and the parameter is among parameters needing to be trained in a subsequent training process. It should be understood that, the fourth neural network module may further include other parameters. This is not limited in this embodiment of the present application.

S220: Obtain a natural language question input by a user. The natural language question herein may be a voice input by using a microphone or the like by the user, or may be a text or graphic input by using a keyboard, a mouse, or the like, or may be in another input form, provided that the system can convert the natural language question input by the user to) a sequence $x=(x_1,x_2,K,x_T)$. A specific input form is not limited in this embodiment of the present application.

S230: Convert the natural language question to a question vector. The natural language question may be used as an input of a first neural network module in the neural network system, to obtain, by means of calculation, the question vector corresponding to the natural language question.

Specifically, multiple natural language questions input by the user may be) considered as multiple word sequences $x=(x_1,x_2,K,x_T)$ with varying lengths (For example, "How tall is Yao Ming?" includes five words, and "Who wrote *Dream of the Red Chamber*?" includes eight words). The word sequence is mapped to a low-dimensional vector sequence. Then, the low-dimensional vector sequence is calculated by using the first neural network module (where the first neural network module may be based on a recursive neural network model, a convolutional neural network model, or the like, and the recursive neural network model is used as an example below for description), to obtain a set of vectors having fixed lengths (that is, a question of any length may be converted to a vector with a fixed dimensions, for example, to a 1000-dimensional vector). These vectors may be referred to as question vectors. These question vectors are representations of the natural language questions in low-dimensional space.

In other words, the words in the natural language question may be respectively mapped to high-dimensional one-hot vectors $x_1,x_2,K,x_T$. Then, the words are mapped to low-dimensional vectors and represented as $u_i^x=W^x x_i$ (i=1, 2, ... T). $W^x$ is a second projection matrix. Further, the input sequence is encoded by using the recursive neural network model, to obtain a question vector.

Each hidden state variable of the recursive neural network model may be obtained by means of recursive calculation: $h_i=f_h(u_i^x,h_{i-1})$ (i=1, 2, ... T). $h_0$ may be any vector, for example, may be a 0 vector. $f_h$ is a multilayer neural network function.

In this embodiment of the present application, a simple implementation is $f_h(u_i^x,h_{i-1})=\varphi_h(u_i^x+W^x h_{i-1})$ (i=1, 2, ... T). $\varphi_h$ is a sigmoid function $$\varphi_h(x) = \frac{1}{1+\exp(-x)}.$$

In this embodiment of the present application, $\varphi_h$ may further model $f_h$ by using a more complex long short-term memory (LSTM) neural network model or a gated recurrent units (GRU) model. A hidden state variable of the recursive neural network model is obtained in this way, and the hidden state variable and a vector representation of a word jointly constitute a vector representation $H=\{u_1^x,K,u_T^x,h_1,K,h_T\}$ of an input question.

The second projection matrix $W^x$ is a parameter of the first neural network module. $f_h$ may further include some parameters, and the parameters are among parameters needing to be trained in a subsequent training process. It should be understood that, the first neural network module may further include other parameters. This is not limited in this embodiment of the present application.

It should be understood that, in this embodiment of the present application, the natural language question may be converted to a question vector by the first neural network module using multiple methods. For example, the natural language question is converted to a question vector by using an RNN encoder (that is, based on the recursive neural network model). Alternatively, the natural language question is converted to a question vector by using a convolutional neural network (CNN) encoder (that is, based on the convolutional neural network model), or the like. This is not limited in this embodiment of the present application.

To sum up, the converting the natural language question to a question vector may include:

using the natural language question as an input of a first neural network module in the neural network system, and expressing a word sequence of the natural language question as a low-dimensional vector sequence; and performing an operation on the low-dimensional vector sequence by using a recursive neural network model or a convolutional neural network model of the first neural network module, to obtain the question vector.

S240: Obtain at least one knowledge answer relevant to the natural language question from a knowledge base by means of text retrieval, where each knowledge answer corresponds to one knowledge answer vector. Using that the knowledge answer is a triplet as an example, at least one triplet relevant to the natural language question is obtained, and the at least one triplet corresponds to at least one triplet vector. That is, a set of relevant candidate triplets may be found by means of text retrieval for each natural language question, thereby obtaining a set of candidate triplet vectors.

S250: The neural network system obtains an intermediate result vector that is based on the knowledge base by means of calculation according to the question vector and the at least one knowledge answer vector, where the intermediate result vector is used to indicate a similarity between the question vector and each knowledge answer vector. That the knowledge answer vector is a triplet vector is still used as an example. The question vector and at least one triplet vector may be used as a second neural network module in the neural network system, to obtain the structured knowledge base-based intermediate result vector by means of calculation.

Specifically, a function of the second neural network module is combining and matching the question vector and a vector of a relevant triplet found in the knowledge base, and outputting and a matching result vector as the intermediate result vector. A similarity between the question vector and a triplet vector representation of each of the at least one triplet is calculated, and an intermediate result vector with an element being the similarity is output. The intermediate result vector is a representation of a matching result between the question and the candidate triplet in the knowledge base.

More specifically, the similarity between each triplet vector t in the set of candidate triplet vectors and the question vector may be calculated in the following manner:

$$S(x,t)=q^T M u^t$$

where q in the foregoing formula is a component of the vector representation H of the question, that is, q may be obtained from H. One optional calculation manner is $q=\Sigma_{i-1}^T u_i^x$, and another optional calculation manner is $q=h_T$. Apparently, q may be obtained from H in another manner. This is not limited in this embodiment of the present application.

M in the foregoing formula is a matching parameter matrix. It is assumed that there are K candidate triplet vectors $\{t_k\}_{k=1}^{K}$ and $r=(r_1,K,r_K)$ where $$r_k = \frac{\exp S(x, t_k)}{\Sigma_l \exp S(x, t_l)} \ (k = 1, 2, \ldots K).$$

A vector r is a representation of a matching result between the question and the knowledge base, that is, the intermediate result vector.

To sum up, the obtaining an intermediate result vector that is based on the knowledge base by means of calculation according to the question vector and the at least one knowledge answer vector may include:

using the question vector and the at least one knowledge answer vector as inputs of a second neural network module in the neural network system, and calculating a similarity between the question vector and each knowledge answer vector by using the second neural network module, where the similarity is an element of the intermediate result vector.

S260: Generate a natural language answer to the natural language question by using the question vector and the intermediate result vector as inputs and calculating a probability of an output sequence. In another word, the natural language answer to the natural language question is obtained by means of calculation by using the question vector and the intermediate result vector as inputs of a third neural network module in the neural network system.

A function of the third neural network module is combining the question vector and an intermediate result vector that indicating a matching result, and outputting the natural language answer. Specifically, the question vector and the intermediate result vector are used as inputs, and a group of natural language symbol sequences are generated by using the third neural network module (For example, the third neural network module may be based on the recursive neural network model or the convolutional neural network model). The symbol sequences are output natural language answers.

Specifically, H and r are used as inputs, and the natural language answer sequences $y=y_1,y_2,K,y_T$) are generated word by word. Calculation is performed according to the following formula:

$$p(y_j|y_1,K,y_{j-1},x,r)=p(y_j|s_j,H,r)$$

where $s_j$ is a state variable of the recursive neural network model.

There are two types of words in the generated answers. The first type is auxiliary natural-language word and the second type is real-answer word. If a binary variable $z_j$ is used to represent the two types (0 represents the first type and 1 represents the second type), $$p(y_j|y_{j-1},s_j,H,r)=p(z_j=0|y_{j-1},s_j)p(y_j|y_{j-1},s_j,z=0)+p(z_j=1|y_{j-1},s_j)p(y_j|z=1,r)$$

where p( ) is a joint probability function for calculating a probability of an output sequence that is with the question vector H and the intermediate result vector r as a condition.

Figure 3:
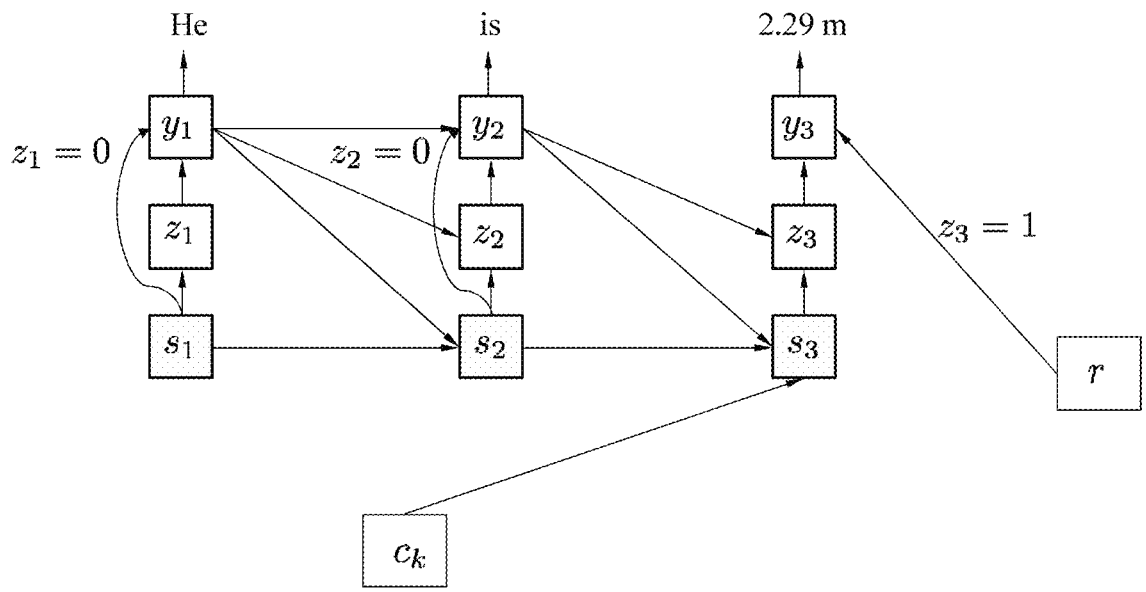
FIG. 3 is a schematic diagram of a calculation procedure of a third neural network module.

In some embodiments, in $p(z_j=1|y_{j-1},s_j)=f_z(y_{j-1},s_j)$, a state variable is $s_j=f_s(s_{j-1},y_{j-1},c_j)$. In this embodiment of the present application, $f_z$ and $f_s$ may be modeled by using the LSTM neural network model or the GRU model. It should be noted that $c_j$ is an attention vector dynamically changing according to positions, and $c_j=\Sigma_{i=1}^{T}\alpha_{j,i}h_i$, where $\alpha_{j,i} \propto a(s_{j-1},h_i)$. In such an attention vector technology, an original question and a part already output of an answer can be aligned, so that a next word can be output more accurately. $p(y_j|s_j,z=0)$ is a probability of generating a natural language word, and is modeled in a manner similar to that of $z_j$. For words of the answer-type, $p(y_j=k|z=1,r)=r_k$. FIG. 3 is a schematic diagram of a calculation procedure of a third neural network module.

It should be understood that, in the using phase, a joint probability should be the maximum when a next word in the answer sequence is generated. In the training phase, the parameters the first neural network module, the second neural network module, the third neural network module, and the fourth neural network module may be continually adjusted by using an optimization algorithm (for example, the stochastic gradient descent algorithm), to maximize a likelihood function $\max_\theta \Sigma_i \log p(y^{(i)}|x^{(i)})$ on the training data.

To sum up, the using the question vector and the intermediate result vector as inputs, and generating a natural language answer to the natural language question by calculating a probability of an output sequence may include:

using the question vector and the intermediate result vector as inputs of a third neural network module in the neural network system, and generating the natural language answer by calculating a joint probability of an output sequence by using a recursive neural network model or a convolutional neural network model of the third neural network module, wherein the question vector and the intermediate result vector are used as conditions for the output sequence.

In some embodiments, the using the question vector and the intermediate result vector as inputs, and generating a natural language answer to the natural language question by calculating a probability of an output sequence may include:

using the question vector and the intermediate result vector as inputs, and generating the natural language answer by calculating a probability of an output sequence by using a recursive neural network model, of the third neural network module, that is based on an attention vector technology.

Algorithms of the neural network modules in the neural network system and the training phase are described above in detail. A principle of the using phase is similar to the principle of the training phase. A method 300 shown in FIG. 4 for human-computer interaction may include:

S310: A neural network system obtains a natural language question input by a user.

S320: The neural network system converts the natural language question to a question vector.

S330: The neural network system obtains at least one knowledge answer relevant to the natural language question from a knowledge base by means of text retrieval, where each knowledge answer corresponds to one knowledge answer vector.

S340: The neural network system obtains an intermediate result vector that is based on the knowledge base by means of calculation according to the question vector and the at least one knowledge answer vector, where the intermediate result vector is used to indicate a similarity between the question vector and each knowledge answer vector.

S350: The neural network system generates a natural language answer to the natural language question by using the question vector and the intermediate result vector as inputs and calculating a probability of an output sequence.

A triplet vector may have been calculated in the training phase and do not need to be determined in the using phase.

This embodiment of the present application provides a method for human-computer interaction. According to the method, a natural language question and a knowledge base are converted to vectors, and a dialog and knowledge base-based question-answering are combined by means of vector calculation, so that a user may be interacted with by using natural language, and a fact-based correct natural language answer may be given according to the knowledge base.

After the model in this embodiment of the present application is implemented, 300 examples of the training data are sampled, and 300 "question-answer" pairs are further selected from the "question-answer" pairs as testing data. Incorrect examples are manually filtered out, and question-answering accuracy (a ratio of a quantity of questions correctly answered to a total quantity of questions) of the model is evaluated. Two types of systems are selected for comparison: 1) The knowledge base-based information retrieval question-answering system (existing technology one). 2) The deep neural network-based dialog system (existing technology five). An evaluation result of question-answering accuracy is shown in Table 1:

TABLE 1

| Model | Training data | Testing data |
|---|---|---|
| Knowledge base-based information retrieval question-answering system | 40% | 36% |
| Deep neural network-based dialog system | 15% | 19% |
| This embodiment of the present application | 46% | 47% |

It can be seen from the evaluation result that the solution in this embodiment of the present application is superior to the existing two solutions. Particularly, the system in this embodiment of the present application can, to some extents, capture semantic of a natural language question, match the semantic of the natural language question with semantic of knowledge in a knowledge base, and give an answer. In addition, by using the solution in this embodiment of the present application, a natural language answer can be generated, while it cannot be ensured to generate a natural language answer by using the retrieval-based question-answering system.

The method for human-computer interaction in this embodiment of the present application is described above in detail. The following describes a neural network system for human-computer interaction in an embodiment of the present application.

Figure 5:
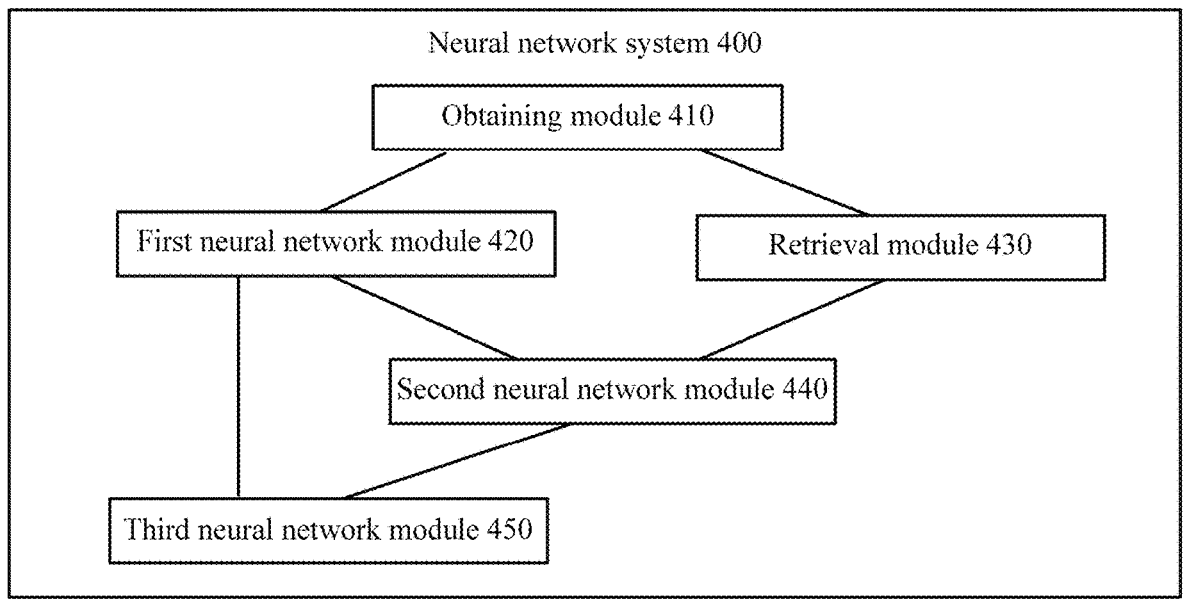
FIG. 5 is a block diagram of a neural network system for human-computer interaction according to an embodiment of the present application.

FIG. 5 is a schematic block diagram of a neural network system 400 for human-computer interaction according to an embodiment of the present application. As shown in FIG. 5, the neural network system 400 for human-computer interaction includes:

an obtaining module 410, configured to obtain a natural language question input by a user;

a first neural network module 420, configured to convert the natural language question obtained by the obtaining module 410 to a question vector;

a retrieval module 430, configured to obtain, from a knowledge base by means of text retrieval, at least one knowledge answer relevant to the natural language question obtained by the obtaining module 410, where each knowledge answer corresponds to one knowledge answer vector;

a second neural network module 440, configured to obtain an intermediate result vector that is based on the knowledge base by means of calculation according to the question vector obtained by the first neural network module 420 and the at least one knowledge answer vector obtained by the retrieval module 430, where the intermediate result vector is used to indicate a similarity between the question vector and each knowledge answer vector; and a third neural network module 450, configured to: use the question vector obtained by the first neural network module 420 and the intermediate result vector obtained by the second neural network module 440 as inputs, and generate a natural language answer to the natural language question by calculating a probability of an output sequence.

This embodiment of the present application provides a neural network system for human-computer interaction. In the neural network system, a natural language question and a knowledge base are vectorized, and an intermediate result vector that is based on the knowledge base and that represents a similarity between a natural language question and a knowledge base answer is obtained by means of vector calculation, and then a fact-based correct natural language answer is obtained by means of calculation according to the question vector and the intermediate result vector.

Optionally, in an embodiment, the knowledge answer is a triplet, the knowledge answer vector is a triplet vector, and the neural network system 400 may further include:

a fourth neural network module, configured to obtain the triplet vector by means of calculation using the triplet as an input.

In this embodiment of the present application, optionally, the fourth neural network module may be specifically configured to:

respectively express a subject, a predicate, and an object of the triplet by using a first one-hot vector, a second one-hot vector, and a third one-hot vector;

respectively perform an operation on the first one-hot vector, the second one-hot vector, and the third one-hot vector by using a projection matrix, to obtain a first low-dimensional vector, a second low-dimensional vector, and a third low-dimensional vector, where the projection matrix is a parameter of the fourth neural network module; and obtain the triplet vector by means of calculation according to the first low-dimensional vector, the second low-dimensional vector, and the third low-dimensional vector.

Optionally, in an embodiment, parameters of the first neural network module 420, the second neural network module 440, the third neural network module 450, and the fourth neural network module are obtained by maximizing a result of a likelihood function on training data, where the training data includes multiple groups of natural language questions and natural language answers.

In this embodiment of the present application, optionally, the first neural network module 420 may be specifically configured to:

use the natural language question as an input, and express a word sequence of the natural language question as a low-dimensional vector sequence; and perform an operation on the low-dimensional vector sequence by using a recursive neural network model or a convolutional neural network model, to obtain the question vector.

In this embodiment of the present application, optionally, the second neural network module 440 may be specifically configured to:

use the question vector and the at least one knowledge answer vector as inputs, and calculate a similarity between the question vector and each knowledge answer vector, where the similarity is an element of the intermediate result vector.

In this embodiment of the present application, optionally, the third neural network module 450 may be specifically configured to:

use the question vector and the intermediate result vector as inputs, and generate the natural language answer by calculating a joint probability of an output sequence by using a recursive neural network model or a convolutional neural network model, where the question vector and the intermediate result vector are used as conditions for the output sequence.

In this embodiment of the present application, optionally, the third neural network module 450 may be specifically configured to:

use the question vector and the intermediate result vector as inputs, and generate the natural language answer by calculating a probability of an output sequence by using a recursive neural network model that is based on an attention vector technology.

Figure 6:
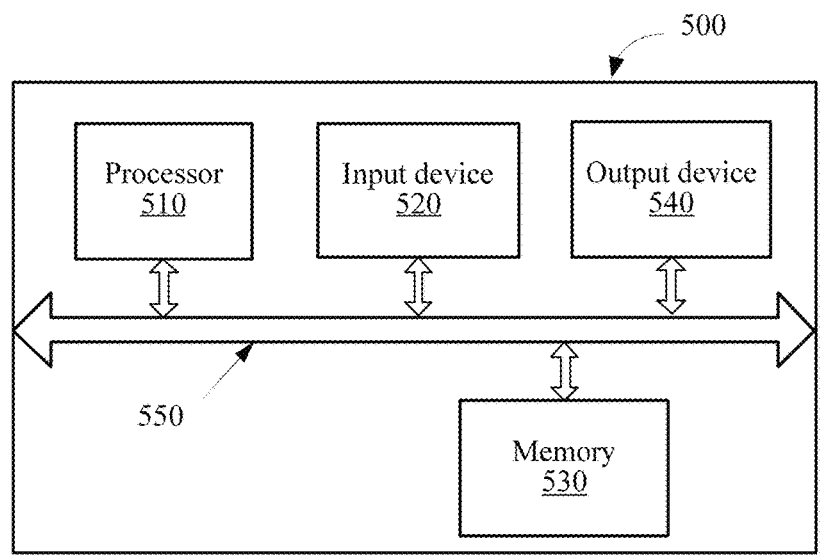
FIG. 6 is a simplified block diagram of user equipment having a human-computer interaction function according to an embodiment of the present application.

It should be noted that, in this embodiment of the present application, the obtaining module 410 may be implemented by using an input device, and the first neural network module 420, the retrieval module 430, the second neural network module 440, the third neural network module 450, and the fourth neural network module may be implemented by using a processor. As shown in FIG. 6, the neural network system may be deployed in user equipment 500 having a human-computer interaction function. The user equipment may include a processor 510, an input device 520, and a memory 530. The memory 530 may be configured to store code or the like executed by the processor 510. The natural language answer may be output by using an output device 540.

The input device 520 is configured to obtain a natural language question input by a user, and the memory 530 is configured to store instructions executed by the processor 510, where the instructions may include:

converting the natural language question to a question vector;

obtaining, from a knowledge base by means of text retrieval, at least one knowledge answer relevant to the natural language question, where each knowledge answer corresponds to one knowledge answer vector;

obtaining an intermediate result vector that is based on the knowledge base by means of calculation according to the question vector and the at least one knowledge answer vector, where the intermediate result vector is used to indicate a similarity between the question vector and each knowledge answer vector; and using the question vector and the intermediate result vector as inputs, and generating a natural language answer to the natural language question by calculating a probability of an output sequence.

Optionally, in an embodiment, the processor 510 is configured to:

use the question vector and the at least one knowledge answer vector as inputs, and calculate a similarity between the question vector and each knowledge answer vector, where the similarity is an element of the intermediate result vector.

Optionally, in an embodiment, the knowledge answer is a triplet, the knowledge answer vector is a triplet vector, and the processor 510 is further configured to:

respectively express a subject, a predicate, and an object of the triplet by using a first one-hot vector, a second one-hot vector, and a third one-hot vector;

respectively perform an operation on the first one-hot vector, the second one-hot vector, and the third one-hot vector by using a projection matrix, to obtain a first low-dimensional vector, a second low-dimensional vector, and a third low-dimensional vector; and obtain the triplet vector by means of calculation according to the first low-dimensional vector, the second low-dimensional vector, and the third low-dimensional vector.

Optionally, in an embodiment, the processor 510 is configured to:

use the natural language question as an input, and express a word sequence of the natural language question as a low-dimensional vector sequence; and perform an operation on the low-dimensional vector sequence by using a recursive neural network model or a convolutional neural network model, to obtain the question vector.

Optionally, in an embodiment, the processor 510 is configured to:

use the question vector and the intermediate result vector as inputs, and generate the natural language answer by calculating a joint probability of an output sequence by using a recursive neural network model or a convolutional neural network model, where the question vector and the intermediate result vector are used as conditions for the output sequence.

Optionally, in an embodiment, the processor 510 is configured to:

use the question vector and the intermediate result vector as inputs, and generate the natural language answer by calculating a probability of an output sequence by using a recursive neural network model that is based on an attention vector technology.

Components of the user equipment 500 are coupled together by using a bus system 550. In addition to a data bus, the bus system 550 includes a power bus, a control bus, and a status signal bus.

Figure 4:
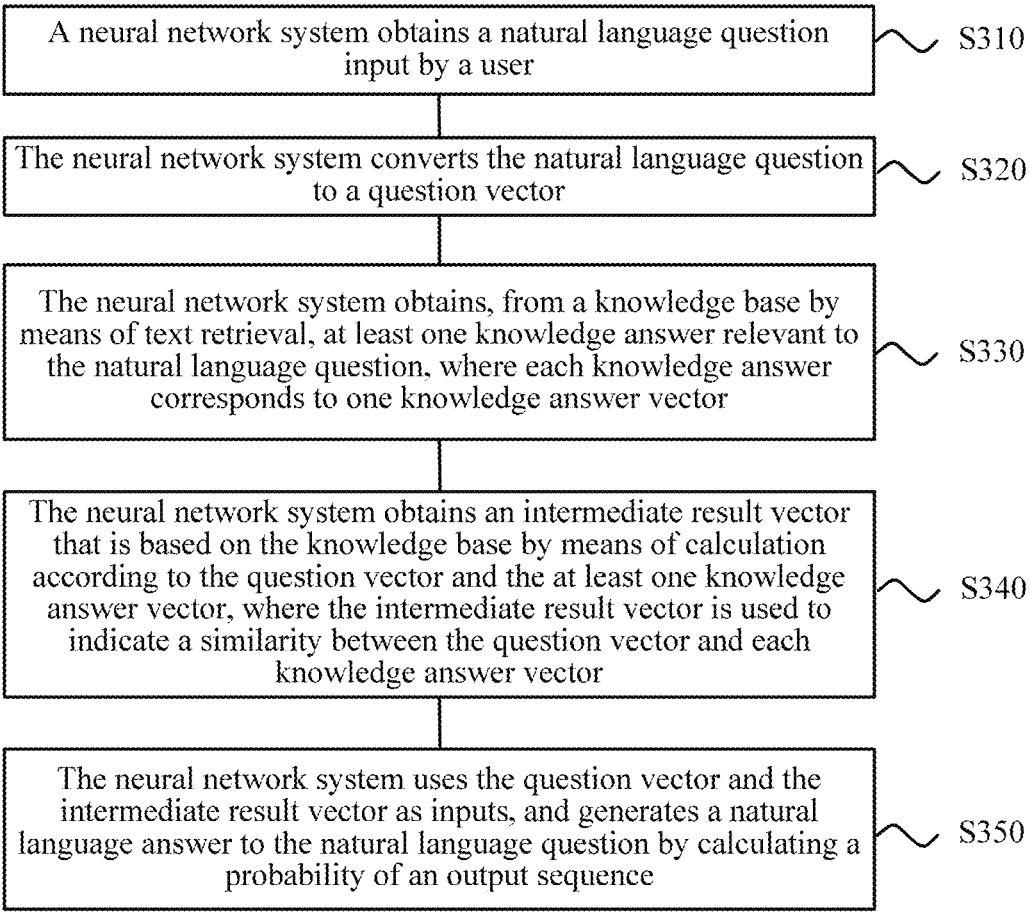
FIG. 4 is a flowchart of a method for human-computer interaction according to an embodiment of the present application.

The neural network system 400 shown in FIG. 5 or the user equipment 500 shown in FIG. 6 can implement the processes implemented in the embodiments of FIG. 2 to FIG. 4 described above. To avoid repetition, details are not described herein again.

It should be noted that the foregoing method embodiment of the present application may be applied to a processor, or implemented by a processor. The processor may be an integrated circuit chip and has a signal processing capability. During implementation, steps in the foregoing method embodiments can be implemented by using a hardware integrated logical circuit in the processor, or by using instructions in a form of software. The processor may be a general purpose processor, a digital signal processor (DSP), an Application Specific Integrated Circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of the present application. The general purpose processor may be a microprocessor or the processor may be any normal processor, or the like. Steps of the methods disclosed with reference to the embodiments of the present application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for use in human-computer interactions, comprising:
    obtaining, by a computing device, a natural language question from a user input;
    converting, by the computing device, the natural language question to a question vector;
    retrieving, by the computing device, at least one knowledge answer relevant to the natural language question from a knowledge base in a remote server to obtain, one or more knowledge answer vectors, wherein each knowledge answer vector corresponds to one of the at least one knowledge answer relevant to the natural language question;
    obtaining, by the computing device, an intermediate result vector according to the question vector and the one or more knowledge answer vectors, wherein elements of the intermediate result vector indicate similarities between the question vector and the one or more knowledge answer vectors;
    using the question vector and the intermediate result vector as inputs, generating, by the computing device, a natural language answer to the natural language question; and
    displaying, by the computing device, the natural language answer to the natural language question,
    wherein using the question vector and the intermediate result vector as the inputs, generating the natural language answer to the natural language question comprises:
    using the question vector and the intermediate result vector as the inputs, calculating a joint probability of an output sequence, wherein the question vector and the intermediate result vector are conditions for the output sequence; and
    generating the natural language answer word by word according to the joint probability of the output sequence, wherein a next word in the natural language answer is determined based on a probability of outputting the next word.

2. The method according to claim 1, wherein obtaining the intermediate result vector according to the question vector and the one or more knowledge answer vectors comprises:

using the question vector and the one or more knowledge answer vectors as inputs, calculating a similarity between the question vector and each of the one or more knowledge answer vectors, wherein each element of the intermediate result vector indicates a similarity between the question vector and one of the one or more knowledge answer vectors.

3. The method according to claim 1, wherein each of the at least one knowledge answer is a triplet, and each of the one or more knowledge answer vectors is a triplet vector, wherein obtaining the one or more knowledge answer vectors comprises:
respectively expressing a subject, a predicate, and an object of the triplet using a first one-hot vector, a second one-hot vector, and a third one-hot vector;
respectively performing an operation on the first one-hot vector, the second one-hot vector, and the third one-hot vector using a projection matrix, to obtain a first vector, a second vector, and a third vector; and
obtaining the triplet vector according to the first vector, the second vector, and the third vector,
wherein a the first, second, and third vectors have lower dimensions than those of the first, second, and third one-hot vectors.

4. The method according to claim 1, wherein converting the natural language question to the question vector comprises:
expressing a word sequence of the natural language question as a vector sequence; and
performing an operation on the vector sequence using a recursive neural network model or a convolutional neural network model, to obtain the question vector.

5. The method according to claim 1, wherein the joint probability of the output sequence is calculated by using a recursive neural network model or a convolutional neural network model.

6. The method according to claim 1, wherein the joint probability of the output sequence is calculated by using a recursive neural network model that is based on an attention vector technology.

7. The method according to claim 1, wherein the next word in the natural language answer is determined to maximize the joint probability of the output sequence.

8. The method according to claim 1, wherein the natural language answer comprises two or more words, and the natural language question is aligned with a part of the natural language answer that has already been output, before outputting the next word of the natural language answer.

9. A computing device, comprising:
a user interface, a network interface, a display component, a processor, and a memory;
wherein the user interface is configured to receive a user input,
the processor, by executing instructions stored in the memory, is configured to:
obtain a natural language question from the user input;
convert the natural language question to a question vector;
retrieve at least one knowledge answer relevant to the natural language question from a knowledge base in a remote server to obtain one or more knowledge answer vectors, wherein each knowledge answer vector corresponds to one of the at least one knowledge answer relevant to the natural language question; obtain an intermediate result vector according to the question vector and the one or more knowledge answer vectors, wherein elements of the intermediate result vector indicate similarities between the question vector and the one or more knowledge answer vectors; and
use the question vector and the intermediate result vector as inputs, generate a natural language answer to the natural language question,
wherein the display component is configured to:
display the natural language answer to the natural language question,
wherein using the question vector and the intermediate result vector as the inputs, generating the natural language answer to the natural language question comprises:
using the question vector and the intermediate result vector as the inputs, calculating a joint probability of an output sequence, wherein the question vector and the intermediate result vector are conditions for the output sequence; and
generating the natural language answer word by word according to the joint probability of the output sequence, wherein a next word in the natural language answer is determined based on a probability of outputting the next word.

10. The computing device according to claim 9, wherein in obtaining the intermediate result vector according to the question vector and the one or more knowledge answer vectors, the processor is configured to:
using the question vector and the one or more knowledge answer vectors as inputs, calculate a similarity between the question vector and each of the one or more knowledge answer vectors, wherein each element of the intermediate result vector indicates a similarity between the question vector and one of the one or more knowledge answer vectors.

11. The computing device according to claim 9, wherein each of the at least one knowledge answer is a triplet, each of the one or more knowledge answer vectors is a triplet vector, and wherein in obtaining the one or more knowledge answer vectors, the processor is configured to:
respectively express a subject, a predicate, and an object of the triplet using a first one-hot vector, a second one-hot vector, and a third one-hot vector;
respectively perform an operation on the first one-hot vector, the second one-hot vector, and the third one-hot vector using a projection matrix, to obtain a first vector, a second vector, and a third vector; and
obtain the triplet vector according to the first vector, the second vector, and the third vector,
wherein the first, second, and third vectors have lower dimensions than those of the first, second, and third one-hot vectors.

12. The computing device according to claim 9, wherein in converting the natural language question to the question vector, the processor is configured to:
express a word sequence of the natural language question as a vector sequence; and
perform an operation on the vector sequence using a recursive neural network model or a convolutional neural network model, to obtain the question vector.

13. The computing device according to claim 9, wherein the joint probability of the output sequence is calculated by using a recursive neural network model or a convolutional neural network model.

14. The computing device according to claim 9, wherein the joint probability of the output sequence is calculated by using a recursive neural network model that is based on an attention vector technology.

15. The computing device according to claim 9, wherein the computing device is a mobile terminal.

16. A non-transitory computer-readable medium storing programs of a neural network system for execution by a computing device comprising at least one processor, wherein the neural network system comprises:
a first neural network module, comprising instructions that, when executed by the at least one processor, control the at least one processor to obtain a natural language question from a user input to the computing device and convert the natural language question to a question vector;
a second neural network module, comprising instructions that, when executed by the at least one processor, control the at least one processor to obtain an intermediate result vector according to the question vector and one or more knowledge answer vectors, wherein elements of the intermediate result vector indicate similarities between the question vector and the one or more knowledge answer vectors;
a third neural network module, comprising instructions that, when executed by the at least one processor, control the at least one processor to generate a natural language answer to the natural language question using the question vector and the intermediate result vector as inputs; and
a fourth neural network module, comprising instructions that, when executed by the at least one processor, control the at least one processor to retrieve at least one knowledge answer relevant to the natural language question from a knowledge base in a remote server to obtain the one or more knowledge answer vectors, wherein each knowledge answer vector corresponds to one of the at least one knowledge answer relevant to the natural language question,
wherein generating the natural language answer to the natural language question using the question vector and the intermediate result vector as the inputs comprises:
using the question vector and the intermediate result vector as the inputs, calculating a joint probability of an output sequence, wherein the question vector and the intermediate result vector are conditions for the output sequence; and
generating the natural language answer word by word according to the joint probability of the output sequence, wherein a next word in the natural language answer is determined based on a probability of outputting the next word.

17. The non-transitory computer-readable medium according to claim 16, wherein in the second neural network module, obtaining the intermediate result vector according to the question vector and the one or more knowledge answer vectors comprises:
using the question vector and the one or more knowledge answer vectors as inputs, calculating a similarity between the question vector and each of the one or more knowledge answer vectors,
wherein each element of the intermediate result vector indicates a similarity between the question vector and one of the one or more knowledge answer vectors.

18. The non-transitory computer-readable medium according to claim 16, wherein each of the at least one knowledge answer is a triplet, each of the one or more knowledge answer vectors corresponding to the knowledge answer is a triplet vector, and wherein in the fourth neural network module, obtaining the one or more knowledge answer vectors comprises:
respectively expressing a subject, a predicate, and an object of the triplet using a first one-hot vector, a second one-hot vector, and a third one-hot vector;
respectively performing an operation on the first one-hot vector, the second one-hot vector, and the third one-hot vector using a projection matrix, to obtain a first vector, a second vector, and a third vector; and
obtaining the triplet vector according to the first vector, the second vector, and the third vector,
wherein the first, second, and third vectors have lower dimensions than those of the first, second, and third one-hot vectors.

19. The non-transitory computer-readable medium according to claim 16, wherein in the first neural network module, converting the natural language question to the question vector comprise:
expressing a word sequence of the natural language question as a vector sequence; and
performing an operation on the vector sequence using a recursive neural network model or a convolutional neural network model, to obtain the question vector.

20. The non-transitory computer-readable medium according to claim 16, wherein the joint probability of the output sequence is calculated by using a recursive neural network model or a convolutional neural network model.

21. The non-transitory computer-readable medium according to claim 16, wherein the joint probability of the output sequence is calculated by using a recursive neural network model that is based on an attention vector technology.

22. The non-transitory computer-readable medium according to claim 16, wherein the computing device is a mobile terminal.

23. The non-transitory computer-readable medium according to claim 16, wherein parameters of the first neural network module, the second neural network module, the third neural network module, and the fourth neural network module are obtained by maximizing a result of a likelihood function on training data, where the training data includes multiple groups of natural language questions and natural language answers.

* * * * *